United States Patent [19]
Shelton

[11] Patent Number: 5,558,010
[45] Date of Patent: Sep. 24, 1996

[54] FOOD STORAGE CHAMBER DOOR OPEN COMPENSATION

[75] Inventor: Winston L. Shelton, Louisville, Ky.

[73] Assignee: Properties Leasing, Louisville, Ky.

[21] Appl. No.: 372,352

[22] Filed: Jan. 13, 1995

[51] Int. Cl.⁶ .............................. A23L 1/00; A21C 13/00
[52] U.S. Cl. ................. 99/468; 99/476; 99/483; 99/493; 99/516; 126/21 A; 126/273 R; 219/400; 219/413; 426/523
[58] Field of Search ............................. 99/331, 342, 476, 99/475, 474, 473, 483, 493, 487, 516, 468; 126/21 A, 21 R, 273 R; 219/400, 412, 413, 414, 494, 510; 392/416; 426/391, 446, 496, 523

[56] References Cited

U.S. PATENT DOCUMENTS

| | | | |
|---|---|---|---|
| 4,173,215 | 11/1979 | Bureau et al. | 99/476 |
| 4,623,780 | 11/1986 | Shelton | 99/476 |
| 5,072,666 | 12/1991 | Hullstrung | 99/476 |
| 5,171,974 | 12/1992 | Koether et al. | 219/413 |

*Primary Examiner*—David Scherbel
*Assistant Examiner*—Reginald L. Alexander
*Attorney, Agent, or Firm*—Wheat, Camoriano, Smith & Beres, PLC

[57] ABSTRACT

An oven for maintaining the quality of stored, heated food includes sensors for sensing the temperature of water in the oven's water reservoir and for sensing the temperature of air in the oven and a control system to compensate for the loss of heat and moisture when the door is opened by increasing the temperatures of the water and air above the set values for a period of time.

2 Claims, 3 Drawing Sheets

FOOD STORAGE CHAMBER DOOR OPEN COMPENSATION

BACKGROUND OF THE INVENTION

The present invention relates generally to processes and equipment for the storage and handling of food product after it has been prepared.

Examples of devices and procedures useful in the preparation and storage of foods in convection type ovens are shown and described in U.S. Pat. No. 4,770,888.

Dry type storage devices generally are in widespread use and have a chamber which is heated by various means and is provided with control means to maintain the temperature in the chamber within selected limits. In the use of dry type storage devices it is not generally recognized that storage of the food without consideration of the overall dynamics of the water cycle overlooks the benefits which can be achieved by use of the equilibrium water activity characteristics of the food.

In accordance with the principles of convection type storage devices water is introduced to the food storage chamber so that the moisture content in the chamber is maintained in relation to the equilibrium water activity of the food product and further, where the water content of the air in the chamber can be adjusted relative to the equilibrium water activity of the food being stored to achieve desired final characteristics of the food product.

The desired equilibrium conditions are established over a period of time when the food product is in the storage unit with the access door closed.

However, if the door is opened the conditioned air in the storage chamber escapes and is typically replaced by ambient air which is at conditions other than those desired to be maintained in the chamber. It then takes a period of time to return the conditions to the desired values after the door is closed. While the desired conditions can be restored, the unit is designed more to maintain conditions than to establish them and a significant time period can elapse before optimum conditions are re-established. During this time the food is exposed to other than preferred conditions and can seriously deteriorate.

No prior art references are known which teach or even remotely suggest the features and advantages provided by devices within the scope of the present invention.

SUMMARY OF THE INVENTION

The present invention provides a new and useful apparatus for holding food after preparation.

More particularly, the present invention provides features useful to maintain quality of the food stored in a chamber by utilizing the beneficial effects arising from interrelation of the temperature and water vapor content in the cooking chamber with the equilibrium water activity of the food in process. In such apparatus the water vapor content in the chamber is adjusted by setting the temperature in a water reservoir to provide water vapor to the chamber and by setting the air temperature within the chamber to provide desired water partial pressure in the chamber.

It has been found that even short term interruption of the optimum conditions in the storage chamber can result in varying degrees of deterioration of the food, for example by loss of moisture, on the occurrence of certain events such as the opening of the door to the chamber.

In the use of convection type storage devices where the air is specifically treated to maintain selected moisture content it is important that the water content of the air be maintained carefully. It has been found that in the event outside air is admitted to the chamber deterioration of the food can be reduced if conditions of the air and water heaters are changed to values other than the values required to maintain the equilibrium air and water values. It has been unexpectedly found that if the air and water temperatures are increased so the integral of the time/temperature function for a reference temperature for the period when the chamber temperature is below a standard equals the integral of the time/temperature function for the reference temperature when the chamber temperature is above the equilibrium temperature the quality of the food in storage is not adversely affected.

By these methods, desired food characteristics, such as temperature and crispness can be prevented from deteriorating even though the access door may be opened frequently.

In accordance with one feature of the present invention it has been unexpectedly found that a reference temperature can be established by detecting the temperature of the chamber adjacent the door.

Examples of arrangements within the scope of the present invention are illustrated in the accompanying drawings and discussed hereinafter but it will be understood that neither the illustrations nor the descriptions are by way of limitation and that other arrangements also within the scope of the present invention will occur to those skilled in the art upon reading the disclosures set out hereinafter.

BRIEF DESCRIPTION OF THE DRAWINGS

Examples of arrangements within the scope of the present invention are illustrated by the accompanying drawings where.

DETAILED DESCRIPTION OF THE DRAWINGS

Figure 1:
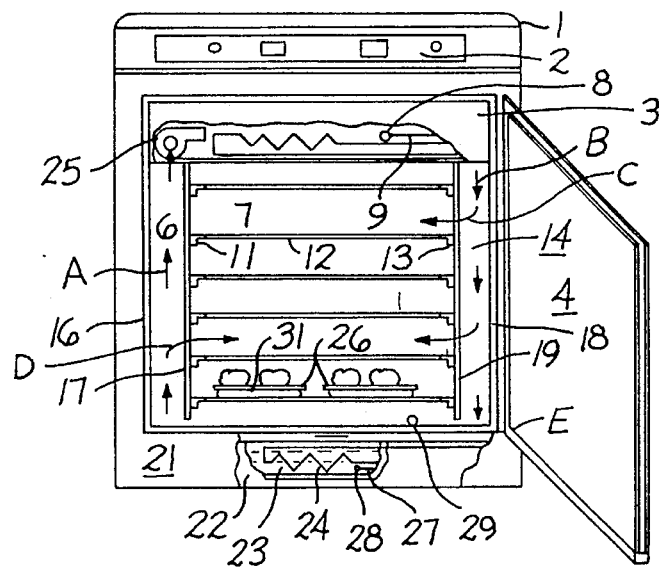
FIG. 1 is a front view partially in cross-section of an example of an apparatus in accordance with the present invention.

FIG. 1 is a front elevational view partially in cross section of an example of an arrangement within the scope of the present invention. Briefly, a cabinet 1 is provided to define a chamber 3 to hold product in accordance with the present invention.

In the arrangement shown in FIG. 1, the processing chamber is defined between internal walls 17 and 19. An air heater 7 is located as shown in a plenum to heat the air in the enclosure but it will be understood that the heater can be located wherever it will serve to heat air in the chamber. Wall 17 with perforations (not shown) defines an air flow path 6 as shown to conduct air to a blower or fan 25 which circulates air through the chamber. As shown in FIG. 1 wall 17 can be perforated so that air stream D flows therethrough and over food stored in the unit which is located on shelves 12 retained on the walls 17 and 19 by brackets 11 and 13 as shown. Also within the scope of the present invention a water reservoir 22 is located in the bottom of the enclosure as shown in FIG. 1 and described hereinafter. A heater 24 is located in the reservoir and heated to selected temperatures so that water is vaporized at selected rates to the air carried over reservoir 22. The air is circulated to plenum 6 where part of the air passes to fan 25 and part to the chamber by means of the apertures (not shown) in walls 17 and 19. In general, the air stream is cycled to and from the food holding portion of chamber 1 at a selected rate necessary to maintain desired conditions within the chamber.

A door 4 is provided on the cabinet to close chamber 3 against loss of heated air and water vapor so that equilibrium conditions can be maintained in the enclosure.

Figure 2:
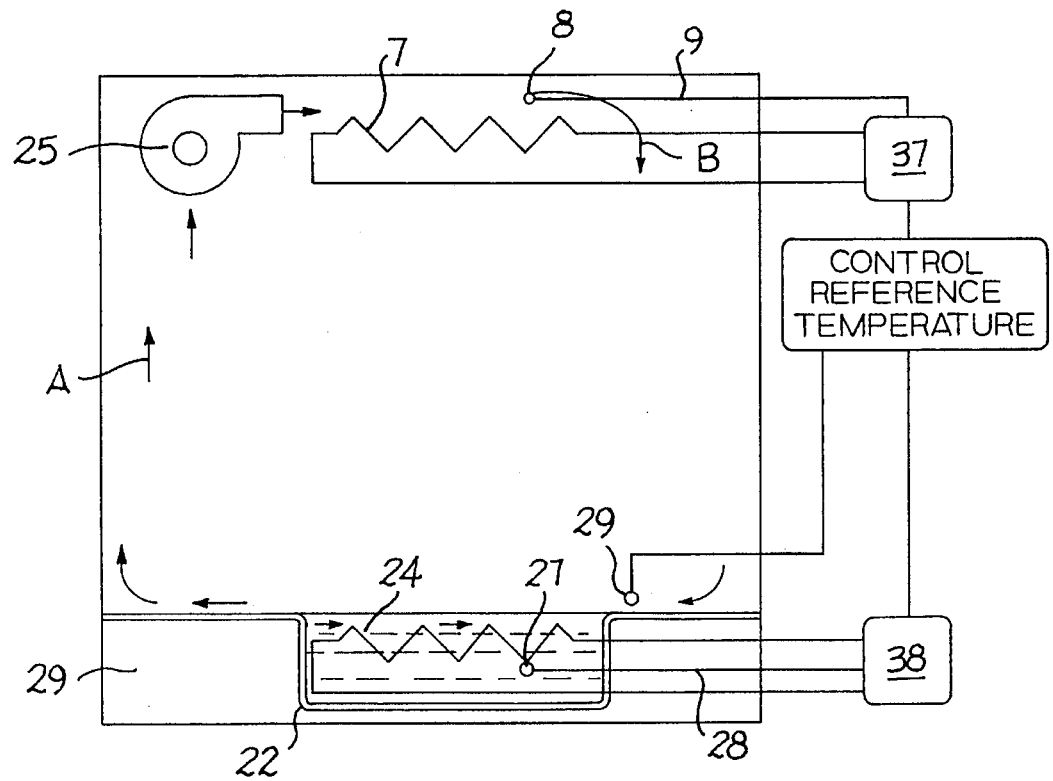
FIG. 2 is an elevational schematic view of one example of an apparatus within the scope of the present invention as shown in FIG. 1.

In accordance with one feature a controller 37 is provided as shown in the schematic of FIG. 2 to provide energy to maintain the temperature of the air at a selected level. The air temperature is sensed by a sensor 8 and transmitted to the controller 37 as is known in the art. In general, the air temperature is maintained at a level above the temperature of the water in reservoir 22 so that a selected water vapor content is maintained in the air stream exposed to the food in the chamber. Reservoir 22 also shown in the arrangement shown in FIG. 1 is adapted to hold a supply of water 23 and a heater 24, for example an electrical heater powered by a control circuit as shown in FIG. 2 is located within the reservoir to evaporate water from the reservoir at a rate determined by the temperature of the water.

A temperature measuring device 27 such as a thermocouple, resistance temperature detector or thermistor is located within the reservoir 22 to generate a signal which indicates the reservoir water temperature.

In most instances energy is supplied to the water heater 24 and controlled by a controller 38 to maintain the water temperature at selected levels.

The air and water temperatures are controlled to maintain selectively variable conditions within the chamber for storing food. The air temperature can be controlled as an increment to the water temperature as shown in FIG. 2 where the difference between the temperatures is determined by the characteristics of the food product to be stored.

Maintenance of the temperature differential provides conditioned air in the chamber which is important to the maintenance of food quality.

When the door is opened to provide access to chamber 3 the conditioned air in the chamber escapes so the atmosphere to which the food is exposed changes, sometimes drastically, and the food quality suffers.

In accordance with one feature of the present invention it has been found that by providing temperature a sensor 29 in the chamber 3 to determine a current temperature in the enclosure and adjusting the air and water temperatures in response to the time and extent of deviation of the chamber temperature from the reference temperature the food quality can be maintained.

In FIGS. 1 and 2 a chamber temperature sensor 29 is provided to detect the temperature of the air in chamber 3. It has been found useful to locate the temperature sensor 29 adjacent the door opening as shown in FIG. 1 so that the sensor quickly detects the door opening by the change in temperature of the air immediately upon opening of the door.

Figure 3:
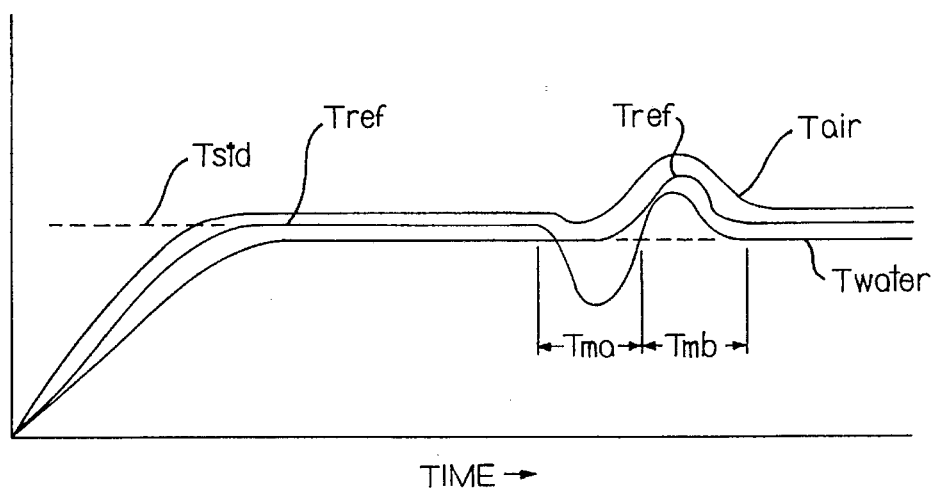
FIG. 3 is a graphic illustration of the operation of an example of a device within the scope of the present invention.
Figure 4:
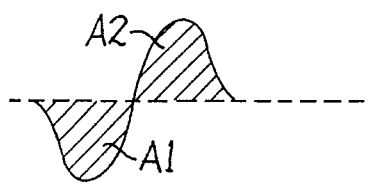
FIG. 4 is a graphic illustration of one mode of operation of a device within the scope of the present invention.
Figure 5:
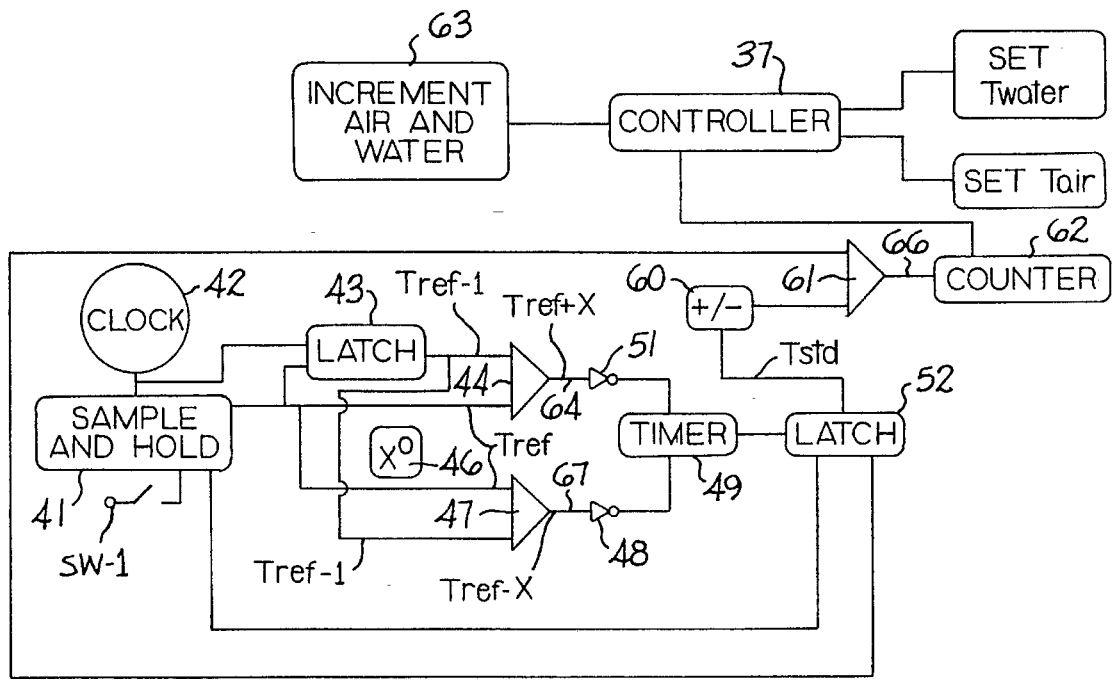
FIG. 5 is an illustration of one example of a schematic diagram of a control circuit useful in devices within the scope of the present invention.
Figure 6:
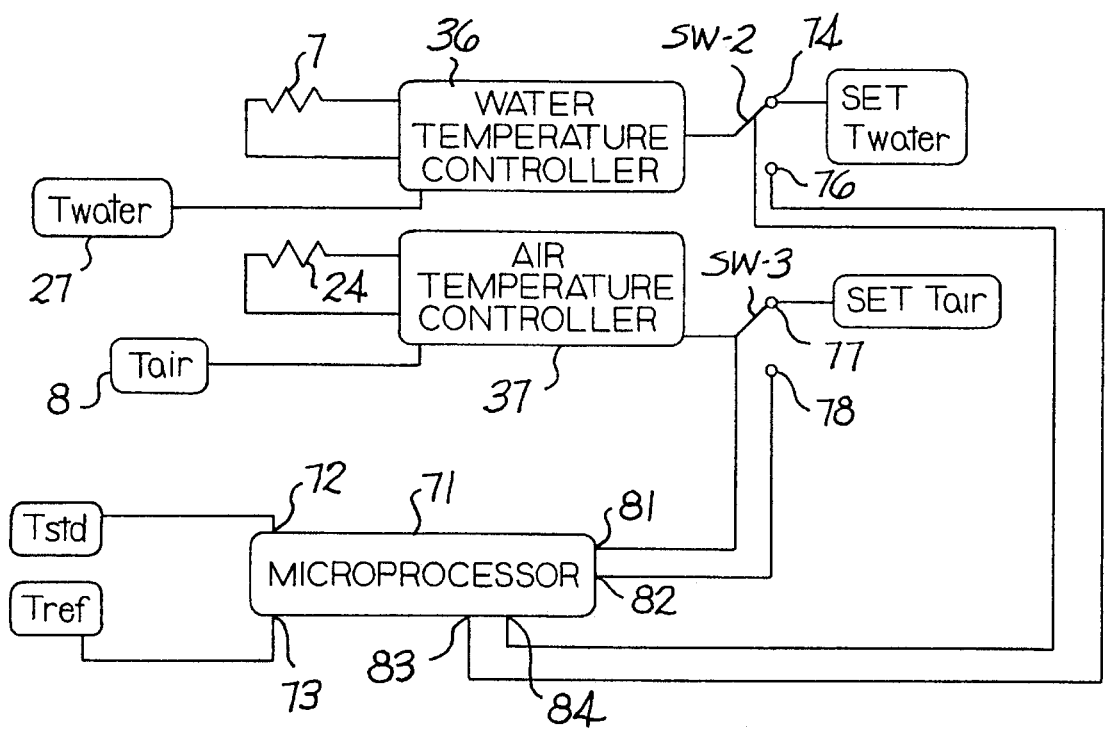
FIG. 6 is an illustration of another example of a schematic diagram of a control circuit useful in devices within the scope of the present invention.

As shown controllers 37 and 38 are provided to control air and water temperatures by means of heaters 7 and 24. In the case of the arrangement shown in FIG. 2, controller 38 supplies power to heater 24 as needed to heat the water in reservoir 22. FIG. 3 illustrates operation of examples of devices within the scope of the present invention as illustrated in FIGS. 5 and 6 described hereinafter. In FIG. 3 air and water temperatures are illustrated to increase from start to equilibrium. As shown a reference temperature Tref which is determined by sensor 29 is provided and comes to an equilibrium value. The equilibrium value of Tref is used to establish a standard for comparison with current value of Tref to determine that the door to the chamber has been opened. For example when the door is opened the reference temperature drops below Tstd and indicates that the door has been opened. At this point, the increase of Tair and Twater commences. Finally, Tref again reaches Tstd but the present invention recognizes that because of the door opening the conditions in the chamber have not reached the original condition. Accordingly, the present invention allows continued increase in Twater and Tair to compensate for the losses. In general, the integral of time and extent of travel of Tref below Tstd is compared with the integral of time Treff is above Treff and at that time the air and water temperatures are returned to normal. An example of the function of the control system is shown in FIGS. 3 and 4 where the temperature excursions are illustrated in FIG. 3 and the integral areas A1 and A2 are shown in FIG. 4. FIG. 5 illustrates one example of a circuit arrangement useful in devices within the scope of the present invention. In FIG. 5 Tstd is generated by supplying Treff to a sample and hold circuit 41 operated by a clock 42. A latch 43 receives the current value of Treff which is transferred by latch 43 as Treff-1. Treff and Treff-1 are transmitted to comparators 44 and 47 with a current value of Treff. The comparators are offset by a value so that a target range is established. Outputs 64, 67 from comparators 44,47 are supplied through inverters 48,51 to a timer 49 so that when both outputs 64, 67 are "OFF" the inverters provide "ON" inputs to timer 49. Timer 49 is preset to provide an output signal after a set time to latch 52. Thus when Tstd has been determined by evaluation of Treff values within a window "+/_" latch 52 supplies the then current value of Treff as Tstd. In FIG. 4 Tstd is supplied through a "+/−" window offset 60 to comparator 61 for comparison with Treff. When there is a variation as when the door 4 is opened the output generated by comparator 61 is supplied as an integral value to counter 62 to measure the time of deviation and allow an equal upward swing of Treff after it has again reached Tstd. In the example of FIG. 5 output 66 initiates counter 62 which retains the time period Treff is below Tstd and causes controller 37 to increment Twater and Tair setpoints. The amount of incrementation of the set points can be selected by any suitable means. FIG. 6 illustrates yet another arrangement within the scope of the present invention using Tstd and Treff as previously described supplied to analog inputs 72, 73 of a microprocessor 71 as known in the art. In the event of a deviation of Treff the microprocessor has the capability to integrate the deviation and bypass Tair and Twater setpoints to controllers 36 and 37 by means of switches SW-2 and SW-3 operated by digital I/O ports of Microprocessor 71 to supply new Tair and Twater set points to controllers 37 and 38 to operate heaters 7 and 24 to fully compensate for the door open losses in the chamber. It will be understood that the foregoing are but a few examples of arrangements within the scope of the present invention and that other arrangements also within the scope of the present invention will occur to those skilled in the art upon reading the disclosure set forth hereinbefore.

The invention claimed is:

1. A hot food storage oven, comprising:

a food receiving chamber;

a reservoir for water in communication with said food receiving chamber;

a first heater to heat the water in said reservoir;

a first sensor to sense the temperature of water in said reservoir;

a second heater to heat the air in said chamber;

a second sensor to sense the temperature of the air in said chamber; and a control system, which operates said second heater so as to maintain the air in said chamber at a selected level above the temperature of water in the reservoir in order to maintain a selected water vapor content in the air, and which operates said second heater by utilizing input from said second sensor to determine a standard air temperature, and, upon detecting a drop in said air temperature below the standard, turns on said first heater and integrates the deviation of said air temperature from the standard air temperature until it returns to the standard temperature, and continues heating said water reservoir so that said air temperature exceeds said standard temperature for a long enough period of time that the integral of the deviation above the standard temperature is substantially equal to the integral of the deviation below the standard temperature.

2. A method of controlling a hot food holding oven having a food storage chamber, a reservoir for water in communication with the food storage chamber, and heaters in the chamber and the reservoir, comprising the steps of:

sensing the air temperature in the food storage chamber and the water temperature in the reservoir;

controlling the heater in the water reservoir so that the water remains at a selected temperature, and controlling the heater in the chamber so that the air temperature remains a set interval higher than the water temperature in order to maintain a certain food quality;

regularly comparing the air temperature at different intervals to determine a standard air temperature and to recognize when the air temperature drops below the standard temperature;

when the air temperature drops below the standard temperature, turning on the heater in the reservoir and integrating the air temperature deviation below the standard over the period of time until it returns to the standard, and continuing to heat the reservoir so that the integral of the air temperature deviation above the standard is substantially equal to the air temperature deviation below the standard.

* * * * *